United States Patent
Morgan et al.

(10) Patent No.: US 6,896,437 B2
(45) Date of Patent: May 24, 2005

(54) FENCE PANEL AND CONNECTOR THEREFOR

(76) Inventors: John Morgan, c/o Presco Pressings (Walsall) Limited, Green Lane, Walsall (GB), WS2 8JH; Mark Edward Bowman, c/o Units 7C and 8C, Cross Green Garth, Cross Green Industrial Estate, Leeds (GB), LS9 0SF ( * ) Notice: Subject to any disclaimer, the term of this patent is extended or adjusted under 35 U.S.C. 154(b) by 0 days.

(21) Appl. No.: 10/411,661

(22) Filed: Apr. 11, 2003

(65) Prior Publication Data

US 2004/0041142 A1 Mar. 4, 2004

(30) Foreign Application Priority Data

Apr. 11, 2002 (GB) .............................................. 0208419

(51) Int. Cl.$^7$ .............................................. A44B 21/00
(52) U.S. Cl. ...................... 403/188; 403/195; 135/909; 32/656.9
(58) Field of Search .................................. 403/188, 187, 403/195, 192; 135/909; 52/656.9, 653.2, 653.1

(56) References Cited

U.S. PATENT DOCUMENTS 3,268,946 A * 8/1966 Case ...................... 403/188 X
3,633,250 A * 1/1972 Romney ...................... 403/76
4,397,448 A * 8/1983 Dillon ...................... 256/65.04

FOREIGN PATENT DOCUMENTS

| GB | 927652 | 5/1963 |
| GB | 2 213 193 | 8/1989 |

* cited by examiner

Primary Examiner—John R. Cottingham
(74) Attorney, Agent, or Firm—Davis Wright Tremaine LLP

(57) ABSTRACT

The present invention relates to a panel fence connector (10) for mutually securing two hollow poles of a fence panel in a desired configuration. The connector (10) comprises a first pole-receiving region (12) for receiving a first pole and a second pole-receiving region (16) adapted to be received within a second pole. The first pole-receiving region (12) is moveable between a clamping configuration and a non-clamping configuration and the second pole-receiving region is moveable from a first position to a second position. The pole-receiving regions (12, 14) are arranged such that in use, positioning of the second pole onto the second pole-receiving region (14) causes the second pole-receiving region (14) to move into its second position, which movement causes the first pole-receiving region (12) to move from its non-clamping configuration into its clamping configuration (FIG. 2).

17 Claims, 2 Drawing Sheets

FENCE PANEL AND CONNECTOR THEREFOR

This application claims the benefit of the filing date under 35 U.S.C. §119(a)–(d) to United Kingdom Patent Application No. GBO2/084 19.2 (pending), filed on Apr. 11, 2002, entitled FENCE PANEL AND CONNECTOR THEREFOR, which is hereby incorporated by reference.

The present invention relates to a connector adapted for use in a fence panel and to a fence panel incorporating such a connector.

Temporary fencing, of the kind used in and around building sites or other sites to be secured, is typically made up of fence panels which are interconnected by removable adjustable clamps which enable adjacent panels to be connected together in mutual alignment or mutually inclined, as desired. Each fence panel comprises a rectangular metal frame formed of a pair of hollow tubular posts and upper and lower horizontal hollow tubular rails. The frame is in-filled with metal mesh or solid metal sheet. The lower ends of the posts are located in large mounting blocks, typically made of concrete or plastic composite, in order to fix the fencing panels in position. The frame is typically made by the welding of the ends of the rails to the posts. This welding operation is difficult to perform satisfactorily without weakening the posts or the rails.

Figure 1:
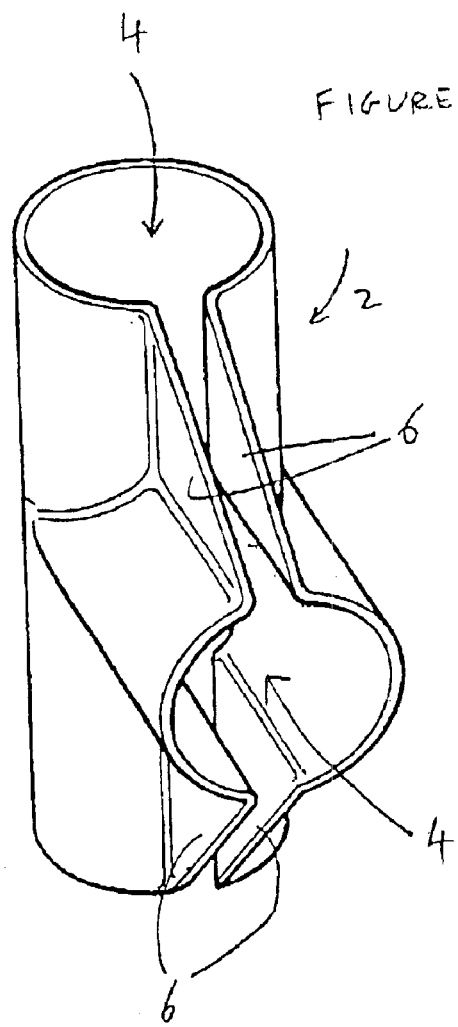

One solution to this problem is disclosed in our co-pending application GB 9930888 in which connectors are provided for interconnecting the posts and the rails. Referring to FIG. 1, each connector 2 has slotted body regions 4 arranged in a "T" configuration for receiving a post and a rail respectively. The regions 4 can be clamped around the post/rail with the latter being held in the desired position by mutually securing pairs of flanges 6.

The need to weld the rails and the posts together can be avoided, and the frame can be assembled easily, simply by inserting the posts and rails into the respective body portions, squeezing the respective flanges into mutual engagement so as to urge the body portions into clamping abutment with the post and the rail, and securing the mutually abutting flanges together.

Although the aforementioned connector solves certain problems, it Is relatively complex in shape and still requires a welding operation.

It is an object of the present invention to provide an improved fence panel connector which obviates or mitigates one or more disadvantages of the prior art connectors.

According to the present invention there is provided a panel fence connector for mutually securing two hollow poles of a fence panel in a desired configuration, said connector comprising:

(i) a first pole-receiving region for receiving a first pole therein, said first pole-receiving region being moveable between a clamping configuration and a non-clamping configuration, and (ii) a second pole-receiving region having at least one ridge on a surface thereof, said second pole receiving region being adapted to be received within a second pole, and moveable from a first position to a second position, wherein in use, positioning of the second pole onto the second pole-receiving region causes the second pole-receiving region to move into its second position, said movement causing the first pole-receiving region to move from Its non-clamping configuration into its clamping configuration and at least one ridge on the second pole receiving region to abut the second pole.

Thus, it will be understood that once in position, the connector holds the first and second poles in the desired configuration without the need for any additional bolts or welded joints.

Preferably, the second pole-receiving region is shaped and/or provided with features which allow it to be retained within the pole (eg. by wedging or otherwise gripping the inside of the pole).

Preferably, the first pole-receiving region is a split tube (i.e. an axial slot extends along its whole length) having a diameter slightly greater than that of the pole it is intended to receive and is preferably made from a resiliently deformable material, such as metal. It will therefore be understood that force can be applied across the tube to narrow the axial slot and therefore reduce the diameter of the tube.

Preferably, the second pole-receiving region comprises a pair of arms which extend away (preferably perpendicularly) from the first pole-receiving region, the root of each arm respectively intersecting the first pole-receiving region on an opposite side of the axial slot. Preferably, the arms are of part-circular cross section.

Preferably the first and second pole-receiving regions are integrally formed.

Preferably at least one, but more preferably both, arms are provided with a deformable ridge, each ridge extending towards a free end of the arm along a surface of the arm remote from the other arm. Preferably each ridge terminates a distance from the free end. Preferably, each ridge has a tapered region, the height of the ridge gradually decreasing in the tapered region towards the free end of the arm.

It will be understood that each arm may be independently provided with more than one ridge, and/or the second pole-receiving region may comprise more than three arms.

In a preferred embodiment, the distance between ridge surfaces when the arms are in their second position is greater than the diameter of the pole within which the arms are to be received (but by no more than the combined height of the ridges above their respective surfaces).

In a highly preferred embodiment, the arms are in mutual abutment when the second pole-receiving region is in its second position at which time they define a tube of slightly narrower diameter than the pole within which the arms are to be received, the maximum diameter of the second pole-receiving region including the deformable ridges being slightly greater than the pole in which the arms are to be received.

The present invention also relates to the use of a connector in accordance with the present invention in assembling a fence panel and to a fence panel having posts and rails and comprising at least one connector in accordance with the present invention.

Figure 2:
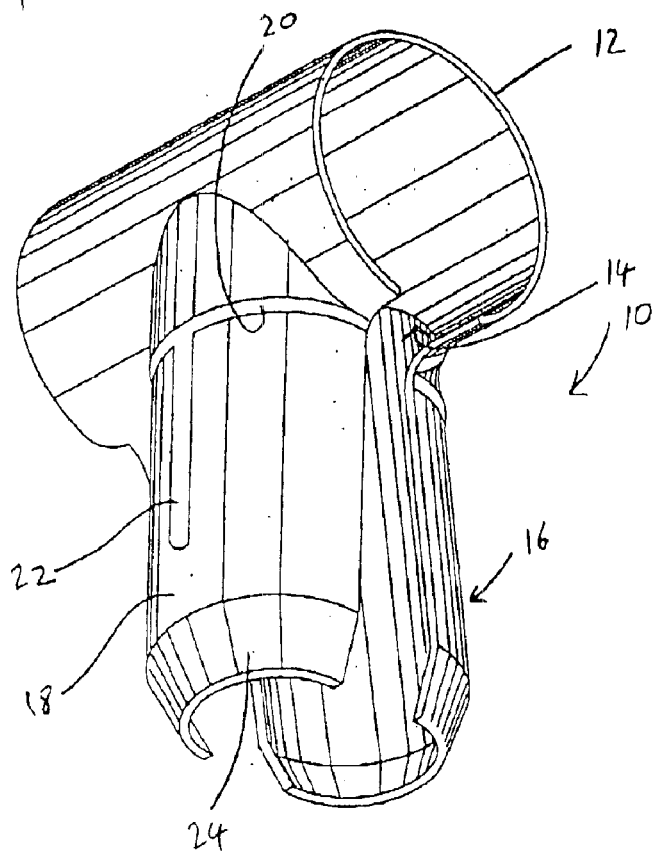
Figure 3:
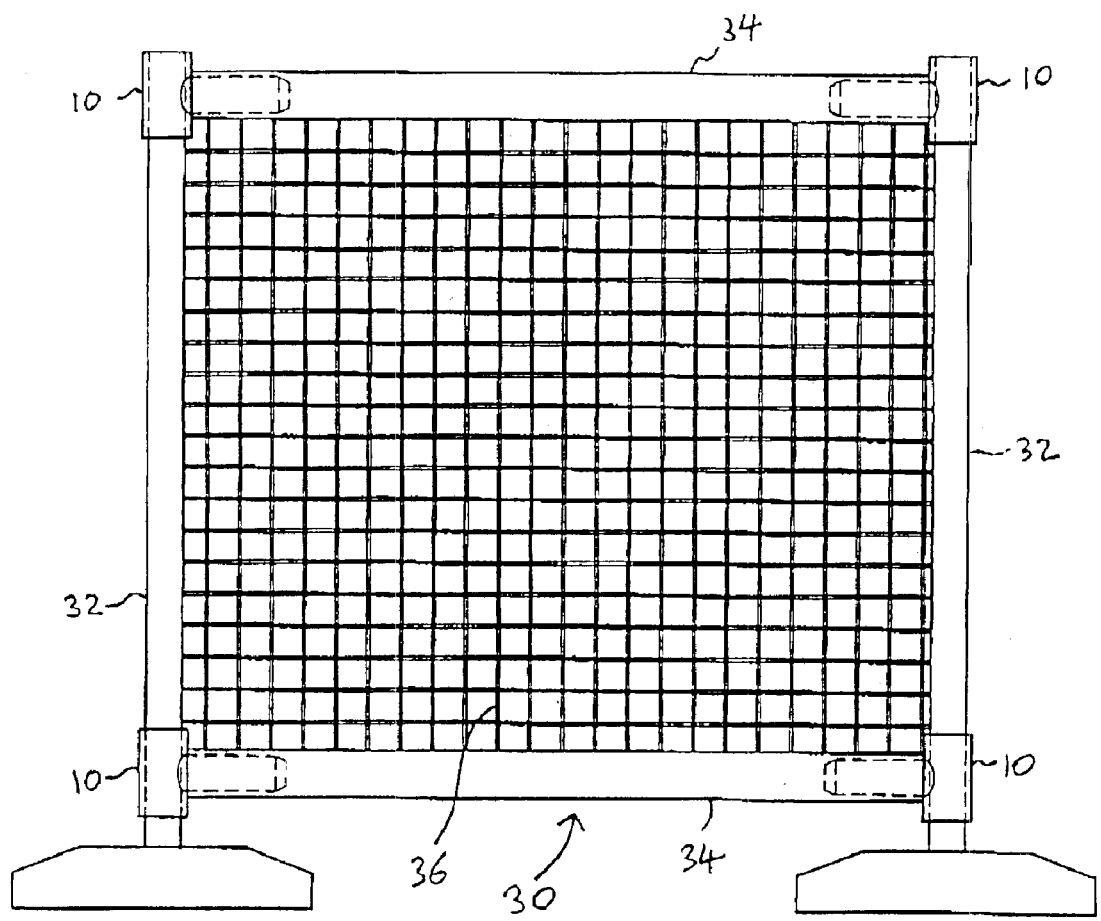

An embodiment of the invention will now be described by way of example only, with reference to the accompanying drawings in which FIG. 1 is a perspective view of a known connector, FIG. 2 is a perspective view of a connector in accordance with the present invention, and FIG. 3 is a schematic of a fence panel comprising four connectors as shown in FIG. 2.

Referring to FIG. 2, a connector 10 is formed from a single sheet of cold rolled steel, stamped and pressed into the desired shape. The connector 10 is basically T-shaped with a first pole-receiving region 12 (forming the arms of the "T") in the form of a tube with an axially extending slot 14. A second pole-receiving region 16 (forming the leg of the "T") is defined by a pair of identical part-tubular arms 18 which are integrally formed with the first pole-receiving region 12 and which extend perpendicularly away from the first pole-receiving region 12 from either side of the slot 14. The connector 10 is formed such that the arms 18 are splayed, that is they are mutually spaced by a greater distance at their free ends than at their intersection with the first pole-receiving region 12. It will be understood that the arms 18 are resiliently biased apart in the sense that they can be flexed from their (first) splayed position to a (second) position in which they are in mutual abutment. In the second position, the arms 18 define a tube of marginally smaller diameter than the pole which is intended to be received by the second pole-receiving region 16, and the axial slot 14 in the first pole-receiving region 12 is narrowed, thereby reducing the effective diameter of the first pole-receiving region 12.

Each arm 18 is provided with an annular abutment surface 20 remote from its free end, which serves in use to locate a pole of a fence panel. A deformable ridge 22 extends perpendicularly to the abutment surface 20 towards the free end of the arm 18 and tapers into the surface of the arm a short distance from its free end. The free end of the arm is itself inwardly tapered to define an end region 24 of part-frustoconical section.

In use, the connector 10 is pushed onto a first pole (usually a post) such that the pole (not shown) is received in the first pole-receiving region 12. It will be understood that at this stage the connector 10 is freely moveable along the pole since the effective diameter of the first pole-receiving region 12 is greater than the first pole (non-clamping position). With the connector 10 at the desired position on the first pole, a second pole (usually a rail) is pushed onto the second pole-receiving region 16 such that the arms 18 are received within the second pole. The part frustoconical end region 24 of the arms 18 helps with the mounting of the second pole, and as the arms 18 are received In the second pole, the arms 18 move from the splayed position towards their second position until the arms 18 are in mutual abutment. As the second pole is moved further along the arms 18 towards the abutment surfaces 20, the pole comes into abutment with the deformable ridges 22. Since the arms 18 are now in mutual abutment, any further movement of the second pole causes deformation (squashing) of the ridges 24 which effectively wedges the second pole onto the second pole-receiving region 16. The second pole is correctly located when an end of the pole comes into abutment with the abutment surfaces 20.

As the second pole is mounted on the arms 18 of the second pole-receiving region 16, it will be understood that movement of the arms 18 towards each other simultaneously causes the axial slot 14 in the first pole-receiving region 12 to narrow, thereby reducing the effective diameter of the first pole-receiving region 12, which therefore tightly grips the first pole and clamps it in place (clamping position).

In an alternative embodiment (not shown), the deformable ridges are omitted and the connector is held in position solely by virtue of the frictional force between the arms and the second pole, by virtue of the outward bias of the arms which tends to return them to their splayed position.

In a further alternative embodiment (also not shown), the arms are shaped such that when in mutual abutment they define a tapering (i.e. frustoconical) tube, the pole becoming wedged on the second pole-receiving region when the diameter of the tapering tube corresponds to the inner diameter of the tube.

From the above it will be readily apparent that the connector of the present invention facilitates the connection of fence poles without the inconvenience and expense of welding or bolting.

Referring to FIG. 3, a fence panel 30 is constructed using four connectors 10 and two posts 32 and two rails 34 to form a framework, each connector 10 being applied as described above to connect adjacent posts 32 and rails 34. The framework so constructed is then in-filled with, for example, wire mesh 36 which is welded or otherwise secured to the posts 32 and rails 34.

We claim:

1. A panel fence connector for mutually securing two hollow poles of a fence panel in a desired configuration, said connector comprising
   (i) a first pole-receiving region for receiving a first pole therein, said first pole-receiving region being moveable between a clamping configuration and a non-clamping configuration, and
   (ii) a second pole-receiving region adapted to be received within a second pole, the second pole-receiving region being moveable from a first position to a second position within the second pole, the pole-receiving regions being arranged such that in use, positioning of the second pole onto the second pole-receiving region causes the second pole-receiving region to move into its second position, said movement causing the first pole-receiving region to move from its non-clamping configuration into its clamping configuration, the second pole-receiving region further including a protruding ridge that extends in generally the same direction as the second pole, and further, the protruding ridge being deformable.

2. A connector as claimed in claim 1, wherein the second pole-receiving region includes one or more gripping regions which allow the second pole-receiving region to be retained within the pole.

3. A connector as claimed in claim 2, wherein the second pole-receiving region is wedge shaped.

4. A connector as claimed in claim 1, wherein the first pole-receiving region is a split tube having a diameter slightly greater than that of the pole it is intended to receive.

5. A connector as claimed in claim 1, wherein the first pole-receiving region is a split tube having a diameter slightly greater than that of the pole it is intended to receive.

6. A connector as claimed in claim 5, which is made from a resiliently deformable material, preferably metal.

7. A connector as claimed in claim 1, wherein the second pole-receiving region comprises a pair of arms which extend away, preferably perpendicularly, from the first pole-receiving region, the root of each arm respectively intersecting the first pole-receiving region on an opposite side of the axial slot.

8. A connector as claimed in claim 7, wherein the arms are of part-circular cross section.

9. A connector as claimed in claim 7, wherein the deformable ridge extends toward a free end of the arm, along a surface of the arm remote from the other arm, and terminates a distance from the free end of the arm.

10. A connector as claimed in claim 9, wherein the ridge has a tapered region, the height of the ridge gradually decreasing in the tapered region towards the free end of the arm.

11. A connector as claimed in any one of claim 9, wherein both arms are provided with the deformable ridge, and wherein for part of said deformable ridges the distance between corresponding regions on the ridge surfaces when the arms are in their second position is greater than the diameter of the pole within which the arms are to be received.

12. A connector as claimed in 11, wherein the arms are in mutual abutment when the second pole-receiving region is in its second position at which time they define a tube of slightly narrower diameter than the pole within which the arms are to be received, the maximum diameter of the second pole-receiving region including the deformable ridges being slightly greater than the pole in which the arms are to be received.

13. A connector as claimed in claim 1, wherein the first and second pole-receiving regions are integrally formed.

14. A fence panel comprising:
  (i) four poles, and
  (ii) four connectors,
wherein the poles are rigidly held in a framework, adjacent ends of each pole being mutually secured by one of the connectors, and wherein at least one of the connectors is in accordance with the connector of claim 1.

15. A fence panel in accordance with claim 14, wherein the framework is rectangular, the poles consisting of a pair of vertical posts and a pair of horizontal rails, each rail being connected at its ends to a different post.

16. A fence panel in accordance with claim 14, wherein the framework is in-filled with a metal lattice.

17. A connector as claimed in claim 1, wherein the second pole-receiving region also includes at least one protruding rib on a surface thereof, to abut the second pole when the second pole-receiving region is in the second position.

* * * * *